UNITED STATES PATENT OFFICE.

EDWARD WATSON, OF GRAND RAPIDS, MICHIGAN.

COMPOSITION OF MATTER FOR RESTRAINING THE SETTING OF PLASTER.

SPECIFICATION forming part of Letters Patent No. 458,743, dated September 1, 1891.

Application filed January 5, 1891. Serial No. 376,705. (No specimens.)

*To all whom it may concern:*

Be it known that I, EDWARD WATSON, residing at Grand Rapids, in the county of Kent and State of Michigan, have invented a new and useful Composition of Matter to be Used for Restraining the Setting of Plasters, of which the following is a specification.

My invention is based upon the use of the substance of hoof, horn, or feathers as an agent to restrain the setting or solidification of all plaster compounds containing calcined gypsum.

In the following specification I show by what combinations and by what means the substance of hoof, horn, or feathers may be rendered soluble and made available as a restrainer for the setting of plaster compounds. A restrainer made from these materials has the great superiority over restrainers made from glue, as glue is very liable to decomposition and is prone to absorb moisture, and when used in plaster is liable to emit a disagreeable odor in closed rooms in damp weather.

The material used by this process is under no circumstances liable to decomposition from moisture or contact with air. It contains a large percentage of sulphur, which appears to render a solution of it entirely antiseptic, and it contains a very large percentage of nitrogen, which renders it a valuable and powerful agent for restraining the setting of plaster.

In practice I proceed as follows to prepare the material for a restrainer: The material is first reduced to as fine a condition as possible and is then dissolved by boiling in a solution of caustic alkali. As a source of alkali I generally use soda-ash or a salt of potash, and render it caustic by introducing sufficient lime to unite with carbonic acid of the carbonate and thus liberate caustic alkali.

The proportions used should be about as follows: Take of the dry material—horn, hoof, or feathers—one pound; soda-ash or sal-soda, one pound; lime, one-half pound, and sufficient water to make a solution. Then boil all together until the material is entirely dissolved. I then add to the solution about four pounds of any alkaline earth, or salt of an alkaline earth, or salt of a caustic alkali, in order to render the mass friable and easily pulverized when dry. I next dry the mass and reduce to a fine powder. I may at times for convenience use the solution of hoof, horn, or feathers by mixing it directly with the mortar without the addition of the salts above named. In preparing the material I do not necessarily confine myself to boiling the material. The boiling is to hasten the process. The same result may be accomplished by mixing the raw material with an alkali and allowing it to remain several days, with perhaps occasionally stirring the mass. The proportions to be used for restraining the setting of plaster must be proportioned to the calcined gypsum only, and no estimate be made of any other material which may enter into the composition of the mortar. In using a powerful restrainer workmen must bear in mind the necessity of strictly complying with the directions, or they may by using too little or too much fail to meet their expectations, and thus injure their work and at once condemn the material as not being practical. In proportioning this restrainer to the calcined gypsum estimate only the dry hoof, horn, or feathers. One to five pounds of the dry material may be estimated as about right for one ton of dry calcined gypsum. Too much would retard the setting of the plaster too long a time for practice and would injure the strength of the plaster when set. In using the restrainer it may be used at the time of mixing the mortar or it may be first intimately mixed with dry calcined gypsum in the above-mentioned proportions and stored for use at any subsequent time.

What I claim is—

In plaster compounds containing calcined gypsum, the addition thereto, as a means of restraining the setting or solidification of the same, of a portion of the substance of hoof, horn, or feathers, combined with an alkaline earth or an alkali, substantially as specified.

EDWARD WATSON.

Witnesses:
JOSEPH J. EMERY,
CORNELIUS J. DE YOUNG.